US012358299B2

(12) United States Patent
Kurosawa et al.

(10) Patent No.: US 12,358,299 B2
(45) Date of Patent: Jul. 15, 2025

(54) LIQUID DISCHARGE HEAD AND LIQUID DISCHARGE APPARATUS

(71) Applicants: Tomoko Kurosawa, Kanagawa (JP); Eiri Sagae, Kanagawa (JP); Makito Nakashima, Kanagawa (JP); Riku Maeshiro, Kanagawa (JP)

(72) Inventors: Tomoko Kurosawa, Kanagawa (JP); Eiri Sagae, Kanagawa (JP); Makito Nakashima, Kanagawa (JP); Riku Maeshiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 18/121,599

(22) Filed: Mar. 15, 2023

(65) Prior Publication Data

US 2023/0294412 A1 Sep. 21, 2023

(30) Foreign Application Priority Data

Mar. 15, 2022 (JP) ................................ 2022-040319
Mar. 28, 2022 (JP) ................................ 2022-051642
Nov. 17, 2022 (JP) ................................ 2022-184305

(51) Int. Cl.
*B41J 2/175* (2006.01)

(52) U.S. Cl.
CPC ................................ *B41J 2/17596* (2013.01)

(58) Field of Classification Search
CPC ................................................... B41J 2/17596
See application file for complete search history.

(56) References Cited

U.S. PATENT DOCUMENTS 3,944,029 A * 3/1976 Jozuka ..................... B41J 19/10 188/297
5,719,610 A * 2/1998 Scheffelin .............. B41J 2/1752 137/614.04
9,676,184 B2 6/2017 Wallsten et al.
2016/0185111 A1* 6/2016 Wallsten .............. B41J 2/17596 347/54
2020/0039217 A1 2/2020 Kaiba et al.

FOREIGN PATENT DOCUMENTS

JP 2002-243062 8/2002
JP 2007-168397 7/2007
JP 2019-217702 12/2019
JP 2020-023177 2/2020

OTHER PUBLICATIONS

Extended European Search Report issued Jul. 26, 2023, in European Patent Application No. 23161937.0, 7pp.

* cited by examiner

*Primary Examiner* — Jason S Uhlenhake
(74) *Attorney, Agent, or Firm* — XSENSUS LLP

(57) ABSTRACT

A liquid discharge head includes a nozzle plate having a discharge port, and a valve facing the nozzle plate to open and close the discharge port. The valve includes a core having a recess, and an elastic member attached to the core. The recess has: an opening rim on a leading end of the core, the opening rim defining an opening of the recess opening toward the discharge port; a bottom face opposite to the opening rim; and a retaining portion having a width wider than a width of a portion other than the retaining portion of the recess in a width direction, the retaining portion disposed in a rear region between the bottom face and a center of the recess. The elastic member includes a first portion fitted into the recess and a second portion projecting from the opening of the recess toward the discharge port.

20 Claims, 9 Drawing Sheets

COMPARATIVE EXAMPLE

COMPARATIVE EXAMPLE

COMPARATIVE EXAMPLE

COMPARATIVE EXAMPLE

COMPARATIVE EXAMPLE

COMPARATIVE EXAMPLE

FIG. 31 COMPARATIVE EXAMPLE
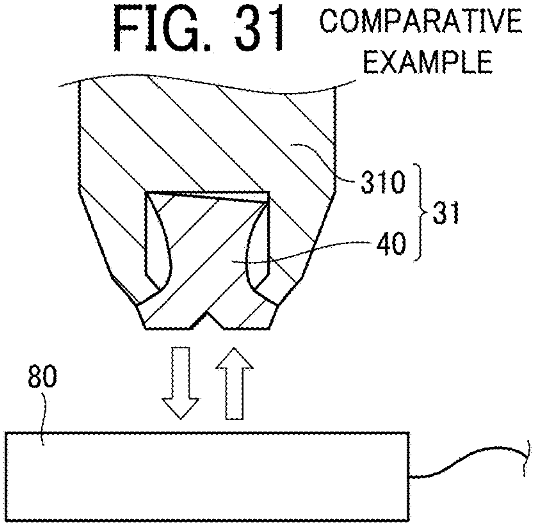
FIG. 32 COMPARATIVE EXAMPLE
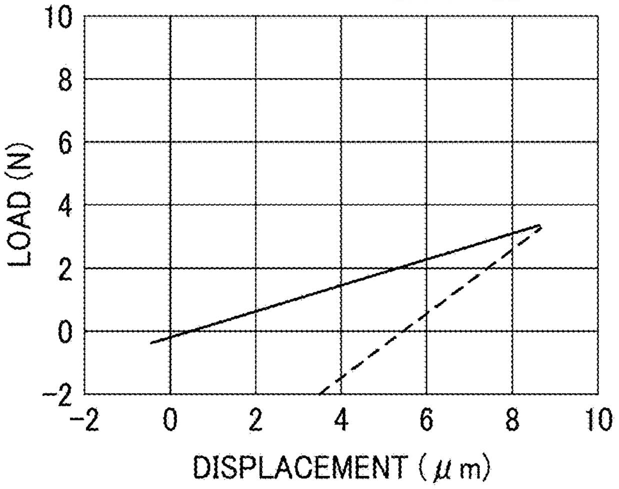
FIG. 33A FIG. 33B FIG. 33C FIG. 33D
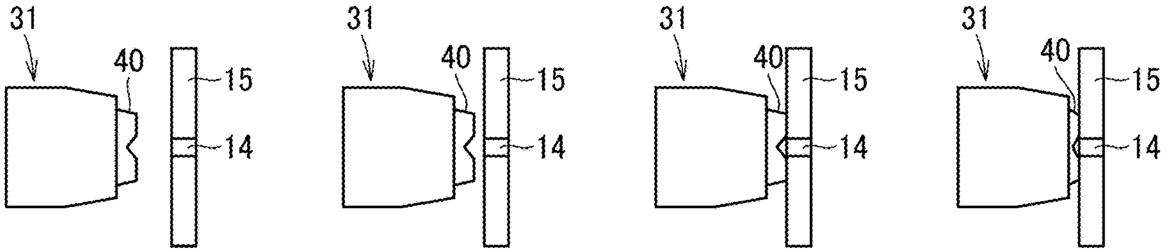
FIG. 33E
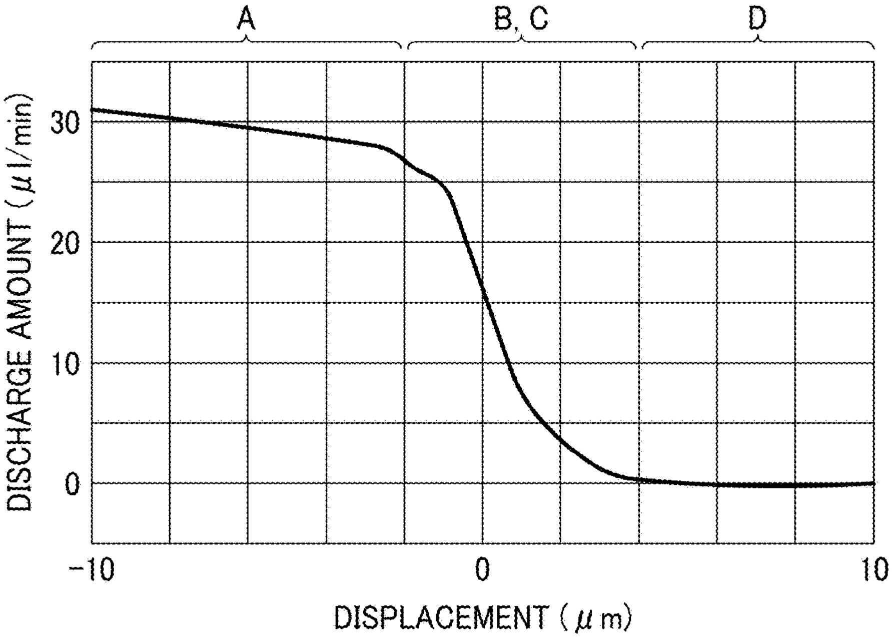

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application Nos. 2022-040319, filed on Mar. 15, 2022, 2022-051642, filed on Mar. 28, 2022, and 2022-184305, filed on Nov. 17, 2022, in the Japan Patent Office, the entire disclosure of each of which is hereby incorporated by reference herein.

BACKGROUND

Technical Field

Embodiments of the present disclosure relate to a liquid discharge head and a liquid discharge apparatus.

Related Art

In the related art, a liquid discharge apparatus has a valve-type nozzle and includes a valve that opens and closes the valve-type nozzle (discharge port) from which a liquid is discharged.

SUMMARY

Embodiments of the present disclosure describe an improved liquid discharge head that includes a nozzle plate and a valve. The nozzle plate has a discharge port from which a liquid is discharged. The valve faces the nozzle plate to open and close the discharge port. The valve includes a core having a recess, and an elastic member attached to the core. The recess has: an opening rim on a leading end of the core, the opening rim defining an opening of the recess opening toward the discharge port in a depth direction of the recess: a bottom face opposite to the opening rim in the depth direction; and a retaining portion having a width wider than a width of a portion other than the retaining portion of the recess in a width direction orthogonal to the depth direction, the retaining portion disposed in a rear region between the bottom face and a center of the recess in the depth direction. The elastic member includes a first portion fitted into the recess and a second portion projecting from the opening of the recess toward the discharge port in the depth direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 31 is a cross-sectional view of the valve examined by a tester;

FIG. 32 is a graph illustrating a relation between a displacement (pushing amount) and a pressing load of the valve according to the comparative example: and FIGS. 33A to 33E are diagrams illustrating a relation between a position (displacement) of the valve and a discharge amount of ink.

Figure 1A:
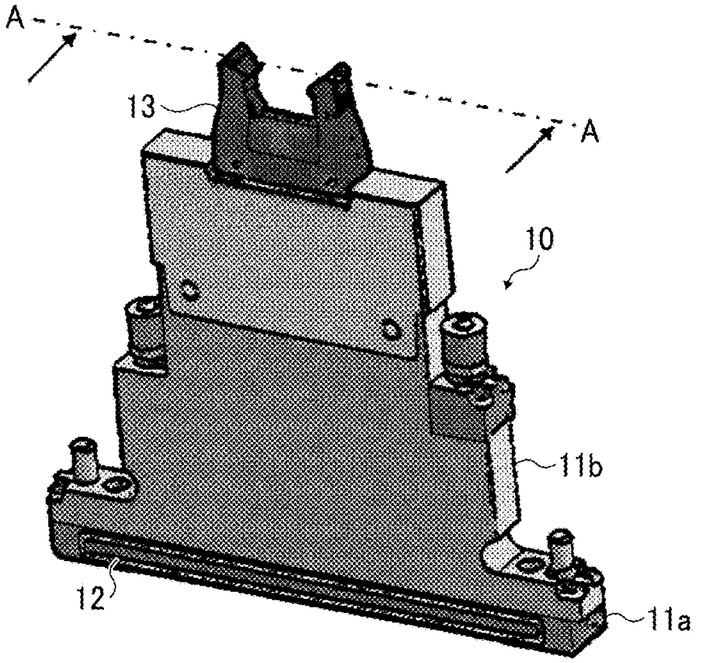
FIGS. 1A and 1B are external views of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a.” “an,” and “the” are intended to include the plural forms as well, unless the context clearly indicates otherwise.

With reference to drawings attached, descriptions are given below of embodiments of the present disclosure. In the drawings for illustrating embodiments of the present disclosure, elements or components identical or similar in function or shape are given identical reference numerals as far as distinguishable, and redundant descriptions are omitted.

Figure 1B:
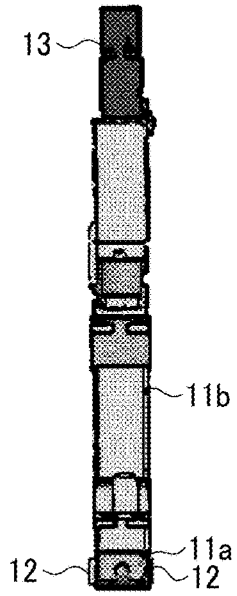

FIGS. 1A and 1B are external views of a liquid discharge head 10 according to an embodiment of the present disclosure. FIG. 1A is an overall perspective view of the liquid discharge head 10, and FIG. 1B is an overall side view of the same liquid discharge head 10. The liquid discharge head 10 according to the present embodiment discharges ink as a liquid.

The liquid discharge head 10 includes a first housing 11*a* and a second housing 11*b*. The second housing 11*b* is stacked on and joined to the first housing 11*a*. In the present embodiment, the first housing 11*a* is made of a material having high thermal conductivity, such as metal. The second housing 11*b* may be made of a different material from the first housing 11*a*, but is preferably made of the same material as the first housing 11*a*. In the following description, the two housings (i.e., the first housing 11*a* and the second housing 11*b*) are collectively referred to as a housing 11.

The first housing 11*a* includes heaters 12 as heating devices on a front surface and a back surface thereof. The heater 12 is temperature controllable to heat the first housing 11*a*. The second housing 11*b* includes a connector 13 for communication of electric signals on an upper portion thereof.

Figure 2:
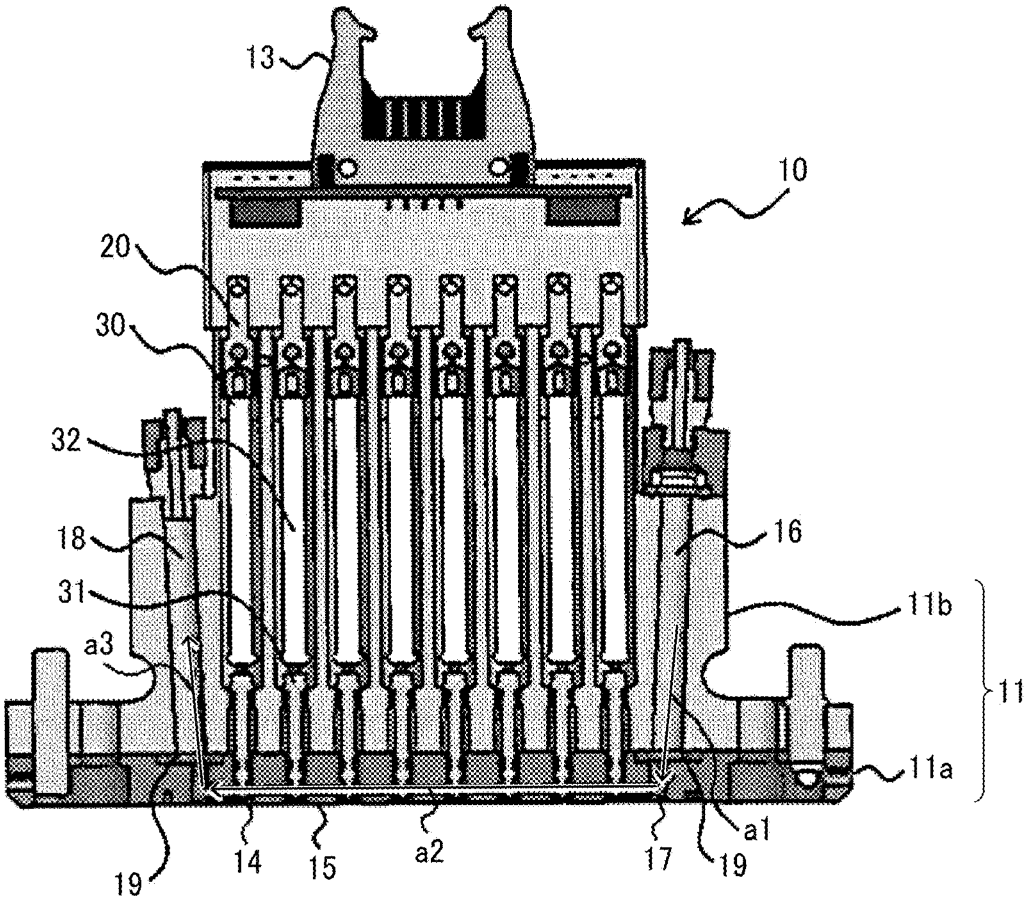
FIG. 2 is an overall cross-sectional view of the liquid discharge head according to the present embodiment.

FIG. 2 is an overall cross-sectional view of the liquid discharge head 10 according to the present embodiment, taken along line A-A in FIG. 1A. The first housing 11*a* holds a nozzle plate 15 as a discharge port substrate. The nozzle plate 15 has a nozzle 14 as a discharge port from which ink (liquid) is discharged. The first housing 11*a* further includes a channel 17 which is a liquid supply portion. The channel 17 sends the ink from a supply port 16 to a collection port 18 over the nozzle plate 15.

The second housing 11*b* includes the supply port 16 and the collection port 18. The supply port 16 and the collection port 18 are connected to one side and the other side of the channel 17, respectively. A plurality of liquid discharge modules 30 is disposed between the supply port 16 and the collection port 18. The liquid discharge module 30 discharges the ink in the channel 17 from the nozzle 14. A restraint 20 is disposed above the liquid discharge module 30.

Each of the liquid discharge modules 30 faces the corresponding nozzle 14 on the nozzle plate 15 held by the first housing 11*a*. In the present embodiment, the eight liquid discharge modules 30 correspond to the eight nozzles 14 arranged in a row, respectively. The number and an arrangement of the nozzles 14 and the liquid discharge modules 30 are not limited to eight as described above. For example, the number of nozzles 14 and the number of liquid discharge modules 30 may be one instead of plural. The nozzles 14 and the liquid discharge modules 30 may be arranged in multiple rows instead of one row.

In FIG. 2, a housing seal 19 is disposed at a joint between the first housing 11*a* and the second housing 11*b*. In the present embodiment, the housing seal 19 is an O-ring that prevents ink leakage from the joint between the first housing 11*a* and the second housing 11*b*.

With the above-described configuration, the supply port 16 takes in the pressurized ink from the outside of the liquid discharge head 10, feeds the ink in the direction indicated by arrow a1, and supplies the ink to the channel 17. The channel 17 feeds the ink from the supply port 16 in the direction indicated by arrow a2. Then, the collection port 18 collects the ink that is not discharged from the nozzles 14 in the direction indicated by arrow a3. The nozzles 14 are arranged along the channel 17.

The liquid discharge module 30 of the liquid discharge head 10 includes a valve 31 and a piezoelectric element 32 as a driving body. The valve 31 opens and closes the nozzle 14. The piezoelectric element 32 drives the valve 31. When a voltage is applied, the piezoelectric element 32 expands and contracts in a longitudinal direction, which is the vertical direction in FIG. 2.

In the above-described configuration, when the piezoelectric element 32 moves the valve 31 upward in FIG. 2, the nozzle 14 closed by the valve 31 is brought into an open state, and ink can be discharged from the nozzle 14. When the piezoelectric element 32 moves the valve 31 downward in FIG. 2, a leading end of the valve 31 seals the nozzle 14 to close the nozzle 14, so that ink is not discharged from the nozzle 14.

Figure 3:
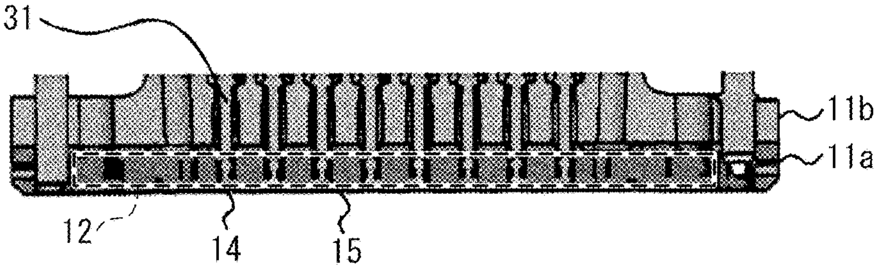
FIG. 3 is a partial cross-sectional view of the liquid discharge head to which a heater is attached.

FIG. 3 is a partial front cross-sectional view of the liquid discharge head 10 illustrating a positional relation between the liquid discharge head 10 according to the present embodiment and the heater 12 (heating device). As described above, the first housing 11*a* includes the heater 12. As indicated by a broken line in FIG. 3, the heater 12 is disposed in the vicinity of the nozzles 14 so as to traverse the plurality of nozzles 14.

Figure 4A:
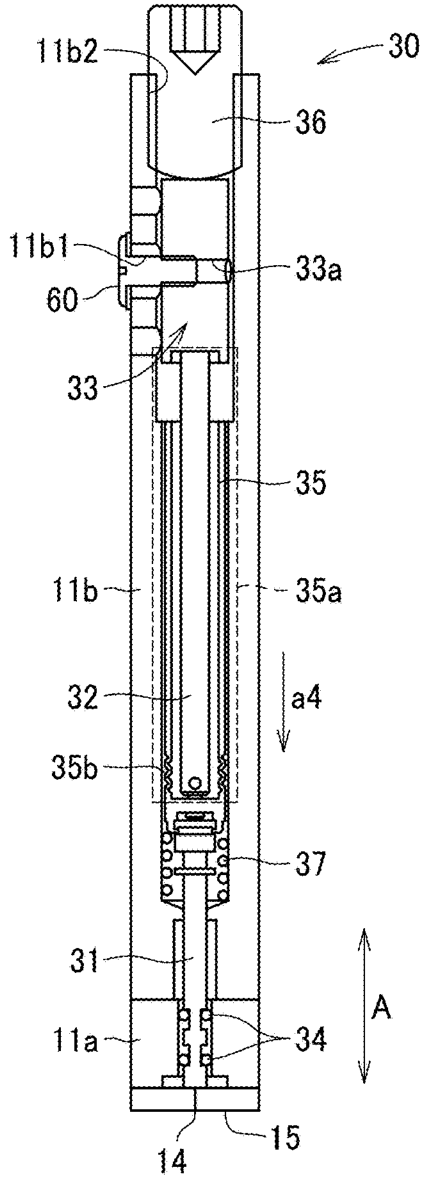
FIGS. 4A and 4B are cross-sectional views of the liquid discharge head.
Figure 4B:
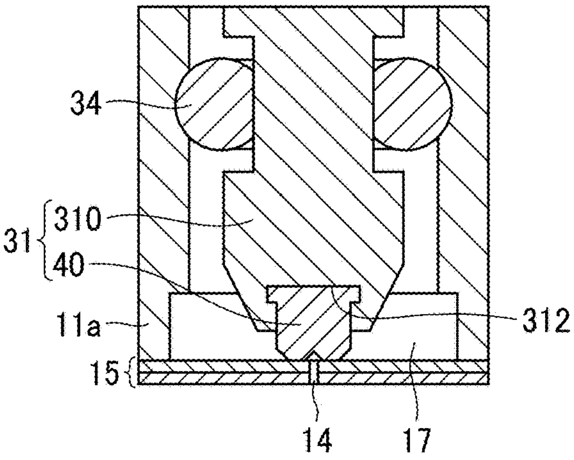

The liquid discharge module 30 is described in detail below with reference to FIGS. 4A and 4B. FIG. 4A is a cross-sectional view of one liquid discharge module 30, and FIG. 4B is an enlarged view of a part of the liquid discharge module 30 illustrated in FIG. 4A. O-rings 34 are attached to an outer periphery of a shaft of the valve 31 at upper and lower two steps. The two O-rings 34 prevent a leakage of high-pressure ink. The liquid discharge module 30 includes the valve 31 and the piezoelectric element 32 described above, a fixing member 33, a holder 35, and a plug 36.

The holder 35 has a driving body accommodating portion 35*a* therein, and accommodates and holds the piezoelectric element 32 in the driving body accommodating portion 35*a*. The holder 35 is made of elastically expandable metal that can expand or contract in the longitudinal direction of the piezoelectric element 32. For example, steel use stainless (SUS) such as SUS304 or SUS316L can be used as the elastically expandable metal. The holder 35 is a frame in which multiple elongated members extending in the longitudinal direction are arranged around the piezoelectric element 32. For example, four elongated members are arranged at intervals of 90°. The piezoelectric element 32 is inserted inside the holder 35 through a gap between the elongated members of the holder 35.

The longitudinal direction of the piezoelectric element 32 is the direction indicated by double-headed arrow A illustrated in FIG. 4A, which is the same as the longitudinal directions of the valve 31, the liquid discharge module 30, and the second housing 11*b*. The longitudinal direction indicated by double-headed arrow A is also the same as a moving direction of the valve 31.

The valve 31 is coupled to one end of the holder 35 on a front side close to the nozzle 14. The holder 35 has a bellows portion 35*b* on the front side close to the nozzle 14. When the piezoelectric element 32 expands and contracts, the bellows portion 35*b* allows the front side of the holder 35 to expand and contract in the same direction as the longitudinal direction of the piezoelectric element 32.

The fixing member 33 is coupled to the other end of the holder 35 on a base side opposite to the front side. In other words, the fixing member 33 is accommodated in an upper portion of the second housing 11*b*. The fixing member 33 has a through screw hole 33*a* extending in a radial direction of the liquid discharge module 30. A positioning screw 60 is screwed into the through screw hole 33*a* from the outside of the second housing 11*b*.

The positioning screw 60 is inserted through a slotted hole 11*b*1, which is long in the longitudinal direction, formed in the upper portion of the second housing 11*b*. Accordingly, the positioning screw 60 is movable by a predetermined length in the longitudinal direction of the second housing 11*b*. The positioning screw 60 is tightened so as to position the fixing member 33 in the longitudinal direction.

As illustrated in FIG. 4A, a female screw hole 11*b*2 is formed in an upper opening of the second housing 11*b*. A plug 36 that contacts the restraint 20 illustrated in FIG. 2 is screwed into the female screw hole 11*b*2. The plug 36 contacts an upper end of the fixing member 33 positioned in the longitudinal direction by the positioning screw 60 to finally fix the position of the fixing member 33.

A compression spring 37 is disposed at a lower end of the second housing 11*b*. The compression spring 37 presses the piezoelectric element 32 and the holder 35 holding the piezoelectric element 32 upward in FIG. 4A.

As illustrated in FIG. 4B, the valve 31 includes a core 310 and a seal member 40. The core 310 is formed of metal such as stainless steel. The core 310 has a recess 312 on a leading end side. The recess 312 opens toward the nozzle 14. Examples of a material of the seal member 40 includes an elastic member such as rubber or fluororesin, for example, polytetrafluoroethylene (PTFE) or polychlorotrifluoroethylene (PCTFE). Preferably, PTFE has a tensile elastic modulus of 0.40 GPa or more and 0.60 GPa or less, and PCTFE has the tensile elastic modulus of 1.03 GPa or more and 2.10 GPa or less. The tensile elastic modulus can be measured according to International Organization for Standardization (ISO) 527: Plastics-Determination of tensile properties or Japanese Industrial Standards (JIS) K7161: Plastics-tensile properties test.

The seal member 40 has a first portion fitted into the recess 312 of the core 310 so as to attach the seal member 40 to the leading end (end on the side close to the nozzle 14) of the core 310. Further, the seal member 40 has a second portion projecting from the recess 312 of the core 310 toward the nozzle 14. Thus, when the piezoelectric element 32 moves the valve 31 downward in the direction indicated by arrow a4 in FIG. 4A, the seal member 40 disposed at the leading end of the valve 31 (the core 310) is pressed against the nozzle plate 15. As a result, the nozzle 14 is sealed (closed) by the seal member 40. On the other hand, when the piezoelectric element 32 moves the valve 31 upward, the seal member 40 is separated from the nozzle plate 15 to open the nozzle 14.

As described above, the valve 31 moves between a contact position at which the seal member 40 (elastic member) is pressed against the nozzle plate 15 (discharge port substrate) and a separated position at which the seal member 40 is separated from the nozzle plate 15, thereby opening and closing the nozzle 14 (discharge port).

In the liquid discharge module 30 according to the present embodiment, the valve 31 includes the core 310 and the seal member 40 attached to the leading end of the core 310. The core 310 and the seal member 40 are joined to each other so that the seal member 40 does not come off from the core 310. An example of joining is bonding with an adhesive. However, when the seal member 40 is made of a material such as a fluororesin which is hard to be bonded, it is difficult to bond the seal member 40 by bonding. Another example of joining is mechanical joining such as crimping or swaging. The leading end of the core 310 is crimped to mechanically join the seal member 40 to the core 310.

Figure 27:
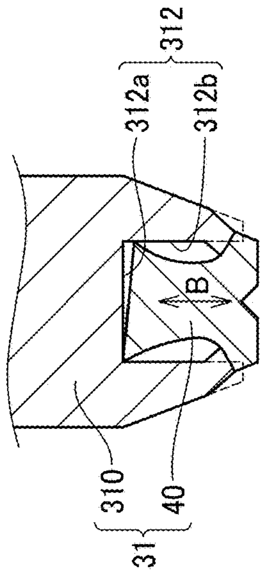
FIG. 27 is a cross-sectional view of a leading end of a valve of a liquid discharge head according to a comparative example.

FIG. 27 is an enlarged cross-sectional view of the valve 31 having a joined structure by crimping. In the configuration illustrated in FIG. 27, the leading end of the core 310 is crimped from the state indicated by the broken line to the state indicated by the solid line in FIG. 27. As a result, the seal member 40 is restrained in the recess 312 so as to prevent the seal member 40 from falling off the recess 312. However, in this case, since the seal member 40 is clamped at a position relatively close to the leading end of the seal member 40 by the crimped portion of the core 310, the seal member 40 may be restricted from being elastically deformed (in particular, elastic deformation in a depth direction B of the recess 312 indicated by double-headed arrow B in FIG. 27). As a result, the seal member 40 may not exhibit a good elastic behavior.

Figure 28:
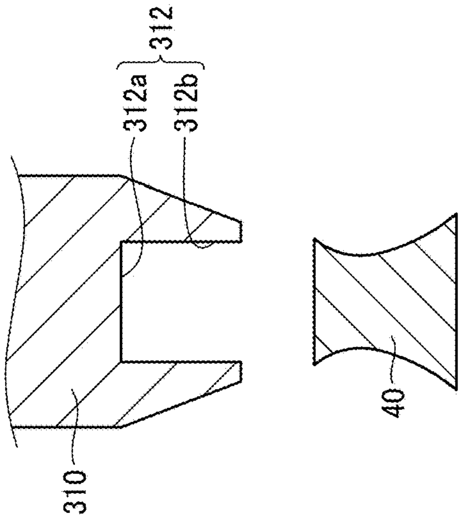
FIG. 28 is a cross-sectional view of the valve in which a core and a seal member are separated from each other according to the comparative example.
Figure 29:
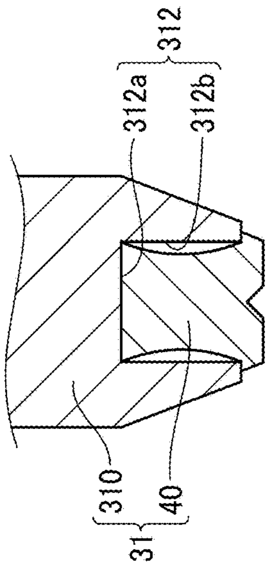
FIG. 29 is a cross-sectional view of the valve in which the seal member is inserted into a recess of the core before crimping according to the comparative example.
Figure 30:
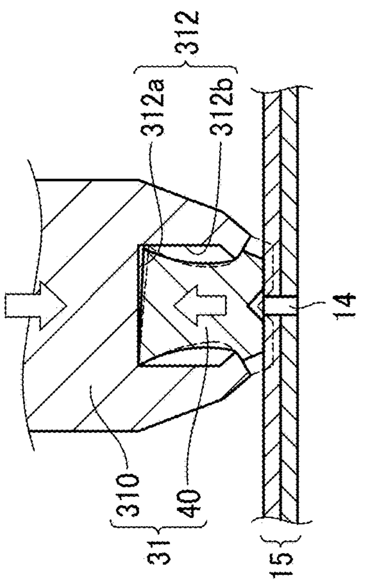
FIG. 30 is a cross-sectional view of the valve illustrated in FIG. 29, the seal member of which is pressed against the nozzle plate.

When the seal member 40 is formed by punching a sheet-shaped material, the seal member 40 is likely to be formed in a shape in which the width is smaller at the middle than at the top and at the bottom of the seal member 40 in the vertical direction as illustrated in FIG. 28. With such a seal member 40, when the seal member 40 is inserted into the recess 312, a gap is generated between the seal member 40 and a side face 312*b* of the recess 312 as illustrated in FIG. 29. From this state, when the leading end of the core 310 is crimped, the seal member 40 is deformed by crimping. Accordingly, the gap between the seal member 40 and the side face 312*b* of the recess 312 is increased, and another gap is also generated between the seal member 40 and a bottom face 312*a* of the recess 312. As a result, the adhesiveness of the seal member 40 in the recess 312 decreases, and the posture of the seal member 40 becomes unstable. As illustrated in FIG. 30, when the seal member 40 is pressed against the nozzle plate 15, the seal member 40 is retracted (moved backward) from the state indicated by the broken line to the state indicated by the solid line in FIG. 30. For this reason, a desired contact pressure of the seal member 40 with respect to the nozzle plate 15 may not be obtained, and a sealing performance may deteriorate.

A test was conducted to examine an elastic behavior of the seal member 40 clamped by crimping in the valve 31 described above. In this test, the seal member 40 having a diameter of 500 μm at the leading end was joined to the core 310 of the valve 31 by crimping. The valve 31 was attached to a tester, and the tester pressed the seal member 40 toward a quartz piezoelectric dynamometer 80 illustrated in FIG. 31 by a total of 10 μm in increments of 1 μm (i.e., pressurization). Thereafter, the tester retracted the seal member 40 by 1 μm at a time to remove the pressing load (i.e., depressurization). A displacement (pushing amount) and the pressing load of the valve 31 during pressurization (forward movement) and during depressurization (backward movement) were measured. FIG. 32 illustrates a relation between the measured displacement and the pressing load.

In FIG. 32, the solid line indicates a load-displacement curve of the valve 31 during pressurization, and the broken line indicates a load-displacement curve of the valve 31 during depressurization. As illustrated in FIG. 32, when the pressing load was 0 N at the start of pressurization, the displacement was 0 μm, and when the pressing load was removed, the displacement was about 5 μm. This is because when the seal member 40 is pressed against the dynamometer 80, the seal member 40 is retracted and displaced into the recess 312, and thus the leading end of the seal member 40 does not return to the original position (position before pressurization) even when the pressing load is removed. As a result, the leading end of the seal member 40 is retracted by about 5 μm. For this reason, although the elastic modulus (primary coefficient) of the seal member 40 is originally about 1 N/μm, the apparent elastic modulus of the seal member 40 decreases to about 0.4 N/μm which is smaller than 1 N/μm.

As described above, in the crimped-joint valve, since the leading end of the seal member 40 is clamped (restrained) by the core 310, the elastic deformation of the seal member 40 is limited, and in addition, since the seal member 40 is retracted into the recess 312 during pressurization, the apparent elastic modulus decreases, so that the seal member 40 may not exhibit a desired elastic behavior. Moreover, such a deterioration of the elastic behavior is not constant and is affected by variations in the crimping process. For this reason, in order to maintain the sealing performance, a position of each valve 31 is adjusted based on the degree of the deterioration of the elastic behavior of the seal member 40 as follows.

FIGS. 33A to 33E are diagrams illustrating a relation between the position (displacement) of the valve 31 and the discharge amount of ink discharged from the nozzle 14. Ranges A to Din FIG. 33E correspond to positions of the valve 31 illustrated in FIGS. 33A to 33D, respectively.

In the state illustrated in FIG. 33A, the leading end of the valve 31 (i.e., the seal member 40) is positioned farthest from the nozzle 14. At this time, the discharge amount of ink is maximum. When the leading end of the valve 31 approaches the nozzle 14 as illustrated in FIG. 33B, the discharge amount of ink decreases. When the leading end of the valve 31 further approaches the nozzle 14 and the seal member 40 comes into contact with the nozzle plate 15 as illustrated in FIG. 33C, the discharge amount of ink becomes substantially 0. However, in this state, the nozzle 14 is not completely sealed. In order to completely seal the nozzle 14, the leading end of the valve 31 (i.e., the seal member 40) is pressed against the nozzle plate 15 as illustrated in FIG. 33D to compress the seal member 40.

However, when the leading end of the valve 31 is pressed against the nozzle plate 15, if the seal member 40 is retracted into the recess 312 as described above, an amount of compression of the seal member 40 may be insufficient, and thus the nozzle 14 may not be sealed. For this reason, a reference position (initial position) of the valve 31 is shifted forward by a distance by which the seal member 40 has been retracted so as to obtain a sufficient amount of compression of the seal member 40.

However, when the reference position of the valve 31 is shifted in the forward direction, since the amount of expansion and contraction of the piezoelectric element is constant (for example, about 20 μm to 30 μm), the position of the valve 31 when the nozzle 14 is opened changes. The sufficient gap between the seal member 40 and the nozzle 14 is preferably, for example, 5 μm or more in order to obtain a predetermined discharge amount of ink when the nozzle 14 is opened. Accordingly, the position of the valve 31 is adjusted while maintaining both the sufficient gap between the seal member 40 and the nozzle 14 when the nozzle 14 is opened and the sufficient amount of compression of the seal member 40 when the nozzle 14 is closed. It is difficult to maintain both the position of the valve 31 when the nozzle 14 is opened and the position of the valve 31 when the nozzle 14 is closed, and it takes a large amount of labor and time to adjust the position of the valve 31. Therefore, the present disclosure has an object to prevent the elastic behavior of the seal member 40 from deteriorating in order to facilitate adjusting the position of the valve 31.

Figure 5:
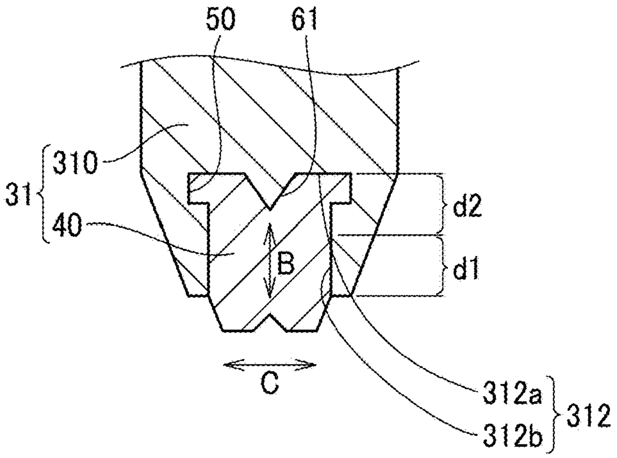
FIG. 5 is a cross-sectional view of a leading end of a valve of the liquid discharge head.

A joined structure of the seal member 40 according to the present disclosure is described below with reference to an embodiment illustrated in FIG. 5. As illustrated in FIG. 5, in the present embodiment, the core 310 has the recess 312 including a retaining portion 50 that prevents the seal member 40 from falling off. The retaining portion 50 is wider than a portion of the recess 312 other than the retaining portion 50. The term “width” refers to the size of the recess 312 in a width direction C indicated by double headed arrow C in FIG. 5, which is orthogonal to the depth direction B indicated by double headed arrow B in FIG. 5. Note that the “width” in the following description and drawings has the same meaning with a “width” in the “width direction C.”

The retaining portion 50 is disposed between the bottom face 312*a* and a center of the recess 312 in the depth direction B. In particular, in the present embodiment, the retaining portion 50 is disposed adjacent to the bottom face 312*a*. The recess 312 has a projection 61 having a triangular cross section on the bottom face 312*a*. The projection 61 is disposed at a center of the bottom face 312*a* and projects from the bottom face 312*a* toward the opening of the recess 312 (downward in FIG. 5).

Figure 6:
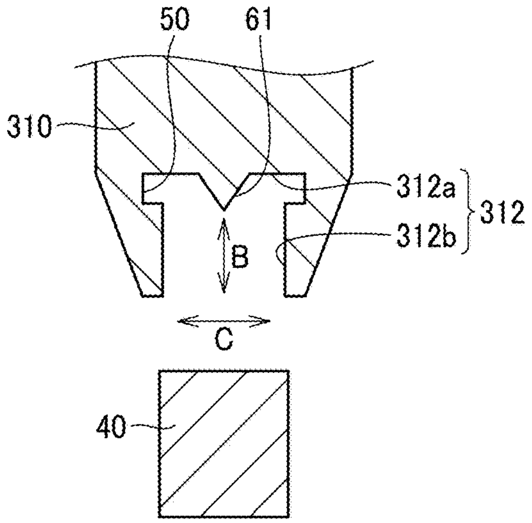
FIG. 6 is a cross-sectional view of the leading end of the valve in which a core and a seal member are separated from each other.

FIG. 6 illustrates the core 310 and the seal member 40 which are separated from each other. As illustrated in FIG. 6, when the seal member 40 is separated from the core 310, the seal member 40 has a columnar shape that is different from a shape of the recess 312. When the seal member 40 having such a shape is inserted into the recess 312, the inserted end face of the seal member 40 is pressed against the projection 61 of the recess 312, and thus the seal member 40 is pushed and expanded in the width direction C. Accordingly, the retaining portion 50 is filled with a portion of the seal member 40 (the expanded portion), and the seal member 40 is fitted into the retaining portion 50 (see FIG. 5).

As described above, in the present embodiment, the seal member 40 is inserted into the recess 312, and the portion of the seal member 40 is fitted into the retaining portion 50. As a result, the seal member 40 is joined to the core 310 so as not to fall off the recess 312. Therefore, in the present embodiment, the seal member 40 can be joined to the core 310 without crimping the leading end of the core 310, and various situations associated with crimping as described above can be solved.

That is, in the present embodiment, since the leading end of the seal member 40 is not clamped by the crimped leading end of the core 310, the seal member 40 is elastically deformable without being restrained on the leading end side. In addition, since the gap due to crimping is not generated between the seal member 40 and the recess 312, the posture of the seal member 40 is stable, and the seal member 40 is less likely to be retracted into the recess 312 during pressurization. Accordingly, since the seal member 40 is less likely to be retracted into the recess 312, a decrease in apparent elastic modulus is also reduced.

In the present embodiment, the retaining portion 50 is disposed adjacent to the bottom face 312*a* of the recess 312. If the retaining portion 50 is disposed on the opening side of the recess 312, elastic deformation of the seal member 40 (in particular, elastic deformation in the depth direction B of the recess 312) may be restrained on the leading end side by a portion of the seal member 40 fitted into the retaining portion 50. Regarding this point, in the present embodiment, as illustrated in FIG. 5, since the retaining portion 50 is disposed in a region d2 of a half of the recess 312 (i.e., a rear region) between the bottom face 312*a* and the center of the recess 312 in the depth direction B, the seal member 40 is not restrained on the leading end side thereof. That is, in the present embodiment, since the seal member 40 is elastically deformable on the leading end side, the elastic behavior of the seal member 40 on the leading end side can be sufficiently maintained, and the amount of compression of the seal member 40 when pressed against the nozzle plate 15 can be sufficiently maintained.

As described above, in the present embodiment, the elastic behavior and the amount of compression of the seal member 40 are sufficiently maintained, thereby reliably seal the nozzle 14. In the present embodiment, the seal member 40 is less likely to be retracted into the recess 312 when pressed against the nozzle plate 15, thereby facilitating adjusting the position of the valve 31. With the configuration according to the present embodiment, the liquid discharge head having high reliability can be provided. Such a liquid discharge head facilitates adjusting the discharge amount of ink (i.e., the position of the valve 31) and has a good sealing performance of the seal member 40 and the reliable joined structure between the seal member 40 and the core 310.

Figure 7:
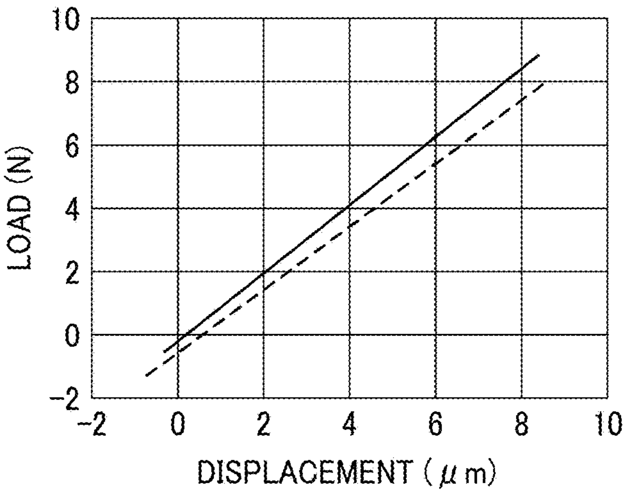
FIG. 7 is a graph illustrating a relation between a displacement (pushing amount) and a pressing load of the valve according to the present embodiment.

FIG. 7 is a graph illustrating a relation between the displacement (pushing amount) and the pressing load of the valve 31 according to the present embodiment. In FIG. 7, the solid line indicates a load-displacement curve of the valve 31 during pressurization, and the broken line indicates a load-displacement curve of the valve 31 during depressurization. The same test described above is conducted to examine the relation according to the present embodiment.

As illustrated in FIG. 7, in the present embodiment, the load-displacement curve (solid line) of the valve 31 during pressurization (forward movement) is not largely changed from the load-displacement curve (broken line) of the valve 31 during depressurization (backward movement), and the position of the leading end of the seal member 40 is substantially the same at the start of pressurization and at the end of depressunzation. This result indicates that the seal member 40 is less likely to be retracted into the recess 312 and exhibits the good elastic behavior in the present embodiment. From the above, the configuration (joined structure) according to the present embodiment maintains the good sealing performance of the seal member 40 and enhance workability of position adjustment of the valve 31.

Figure 8:
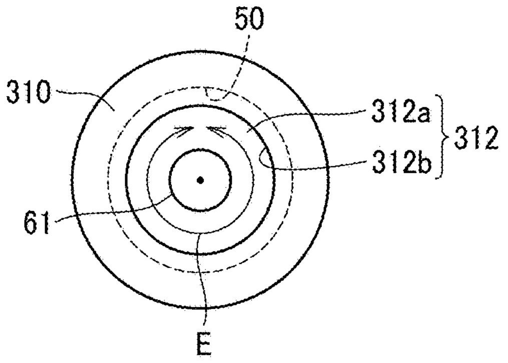
FIG. 8 is a diagram illustrating an example of arrangement of a retaining portion of the core.
Figure 9:
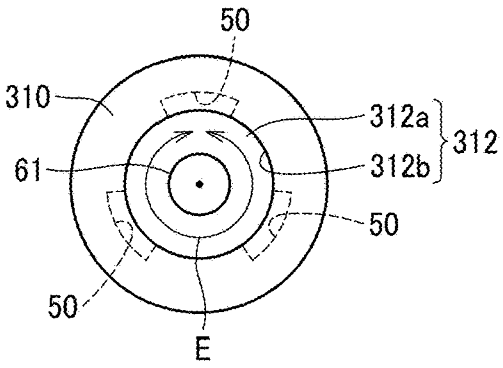
FIG. 9 is a diagram illustrating another example of arrangement of the retaining portion of the core.

In the present embodiment, the retaining portion 50 is disposed adjacent to the bottom face 312*a*, but the retaining portion 50 is not necessarily disposed adjacent to the bottom face as long as the retaining portion 50 is disposed within the range d2 of the half of the recess 312 (i.e., the rear region) between the bottom face 312*a* and the center of the recess 312. The retaining portion 50 has, but not limited to, the rectangular cross section as illustrated in FIG. 5, and may be a triangular or semicircular cross section. As long as the retaining portion 50 is wider than the other portion (i.e., a portion of the recess 312 other than the retaining portion 50), the width of the recess 312 may sharply increases from the other portion to the retaining portion 50 or may gradually increases from the other portion to the retaining portion 50. The width of the retaining portion 50 preferably increases from the other portion to the retaining portion 50 at a right angle or an angle close to the right angle with respect to the depth direction B of the recess 312 (for example, a shape illustrated in FIG. 5) to enable the retaining portion 50 to prevent the seal member 40 from falling off the recess 312. The retaining portion 50 may be continuously disposed around the center of the bottom face 312*a* in a circumferential direction E indicated by double headed arrow E as illustrated in FIG. 8, or may be partially disposed in the circumferential direction E as illustrated in FIG. 9.

Modifications of the valve 31 are described below. In the following description, portions different from those of the above-described embodiment is mainly described. The other portions have basically the same configuration, and thus descriptions thereof is appropriately omitted.

Figure 10:
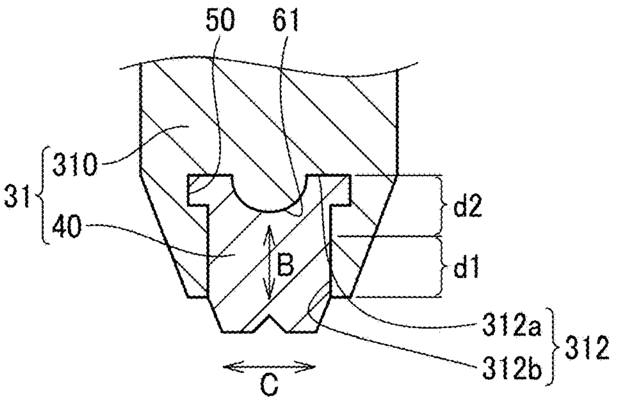
FIG. 10 is a cross-sectional view of a recess of the core according to a modification of the present embodiment.

In the modification illustrated in FIG. 10, the shape of the projection 61 in the recess 312 is different from that of the above-described embodiment. In the above-described embodiment, the projection 61 has a conical shape or a pyramid shape having a triangular cross section (see FIG. 5), but in the modification, the projection 61 has a hemispherical shape as illustrated in FIG. 10 or a spherical shape. As described above, even when the projection 61 has the hemispherical shape or the spherical shape, the projection 61 can push and expand the seal member 40 in the width direction C to assist the seal member 40 to be filled into the retaining portion 50. In other modifications, the projection 61 may have another shape (a cylindrical shape, a prismatic shape, or the like).

Figure 11:
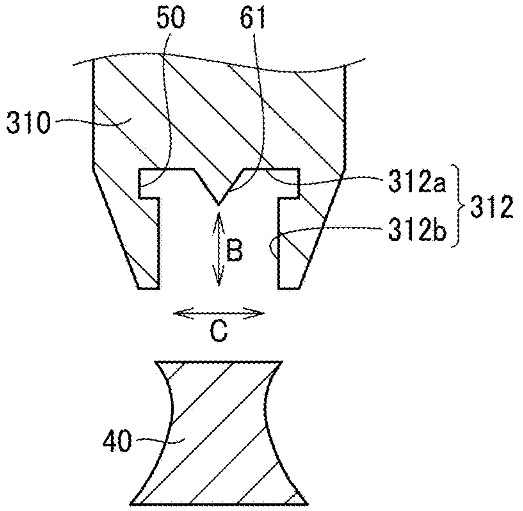
FIG. 11 is a cross-sectional view of the seal member according to another modification of the present embodiment.

FIG. 11 is a cross-sectional view of the seal member 40 which is separated from the core 310 according to another modification of the present embodiment. In the above-described embodiment, the seal member 40 has a columnar shape having a uniform width (see FIG. 6), but the seal member 40 illustrated in FIG. 11 has a shape in which the width decreases from the top and the bottom toward the middle of the seal member 40 in the vertical direction in FIG. 11. As described above, when the seal member 40 is formed by punching, the seal member 40 is likely to be formed in such a shape.

Figure 12:
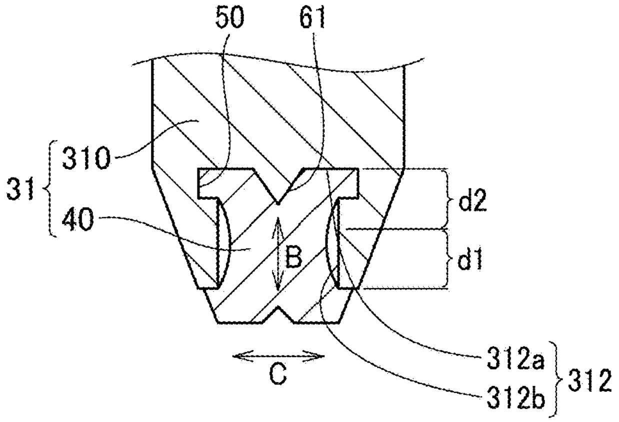
FIG. 12 is a cross-sectional view of the seal member illustrated in FIG. 11 when inserted into the recess.

When the seal member 40 having such a shape is inserted into the recess 312, a gap may be formed between the side face 312*b* of the recess 312 and the seal member 40 as illustrated in FIG. 12. In this case, the adhesiveness of the seal member 40 to the recess 312 decreases, but a slight gap between the side face 312*b* of the recess 312 and the seal member 40 is allowable.

Also in this case, since the seal member 40 is joined to the core 310 without crimping, the seal member 40 is not restrained from elastically deforming by crimping and the gap between the seal member 40 and the recess 312 does not expand. Accordingly, the seal member 40 can exhibit the good elastic behavior. The seal member 40 is less likely to be retracted into the recess 312 when pressed against the nozzle plate 15, thereby facilitating adjusting the position of the valve 31. Also in this case, the good sealing performance of the seal member 40 can be maintained and the workability of position adjustment of the valve 31 may be enhanced.

Figure 13:
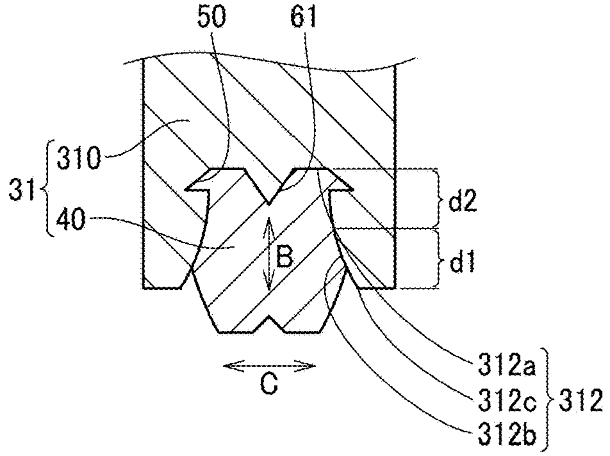
FIG. 13 is a cross-sectional view of the recess according to another modification of the present embodiment.
Figure 14:
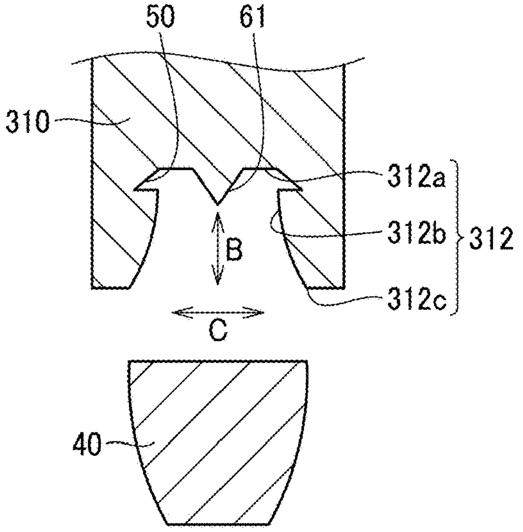
FIG. 14 is a cross-sectional view of the recess illustrated in FIG. 13, from which the seal member is separated.

In the example illustrated in FIGS. 13 and 14, the shapes of both the recess 312 and the seal member 40 are different from those of the above-described embodiment. Specifically, in the example illustrated in FIGS. 13 and 14, the width of the recess 312 gradually increases toward an opening rim 312*c* of the recess 312, and the retaining portion 50 have a triangular cross section. On the other hand, the width of the seal member 40 gradually decreases toward the leading end thereof (in other words, toward the nozzle 14).

Figure 15:
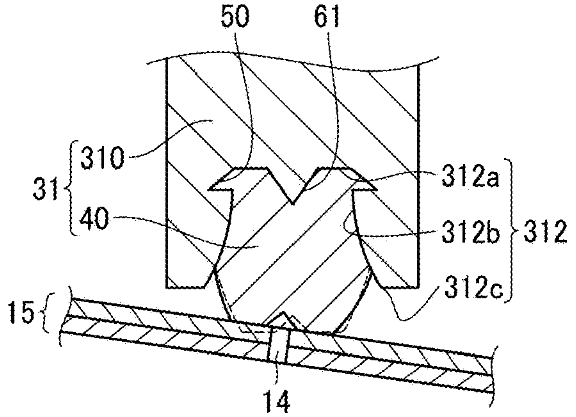
FIG. 15 is a cross-sectional view of the valve illustrated in FIG. 13, the seal member of which is pressed against a nozzle plate.

As described above, the retaining portion 50 may have the triangular cross section. The width of the recess 312 gradually increases toward the opening rim 312*c* thereof and the width of the seal member 40 gradually decreases toward the leading end thereof. As a result, a clearance is formed between the seal member 40 and the side face 312*b* of the recess 312 at the opening rim 312*c* of the recess 312 and in the vicinity of the opening rim 312*c* (see FIG. 13). Accordingly, in the example illustrated in FIG. 13, when the leading end of the seal member 40 is pressed against the nozzle plate 15 as illustrated in FIG. 15, even if the nozzle plate 15 is inclined, the seal member 40 is deformed following the inclination of the nozzle plate 15. That is, the leading end of the seal member 40 is not restrained by the side face 312*b* of the recess 312, and the clearance between the seal member 40 and the opening rim 312*c* allows the seal member 40 to be deformed following the inclination of the nozzle plate 15.

As a result, when the seal member 40 is pressed against the nozzle plate 15, the seal member 40 does not apply an excessive pressing load to the nozzle plate 15. Accordingly, the nozzle plate 15 is prevented from being deformed, and thus ink is not obliquely discharged from the nozzle 14 of the nozzle plate 15. Since the adhesiveness of the seal member 40 to the nozzle plate 15 can be maintained, the good sealing performance can be obtained. Further, since the gap between the seal member 40 and the nozzle 14 when the nozzle is opened can be sufficiently maintained, a predetermined discharge amount of ink can be discharged from the nozzle 14.

The clearance between the seal member 40 and the side face 312*b* of the recess 312 is preferably disposed within a region d1 of a half of the recess 312 from the center of the recess 312 toward the opening of the recess 312 including at least the opening rim 312*c* (see FIG. 13) to allow the leading end side of the seal member 40 to be deformed.

Figure 16:
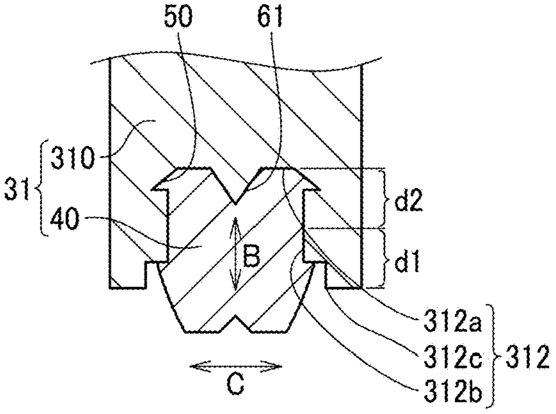
FIG. 16 is a cross-sectional view of the recess according to still another modification of the present embodiment.
Figure 17:
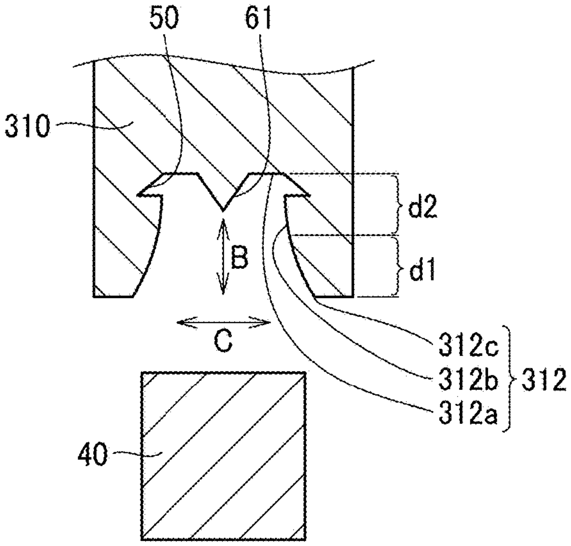
FIG. 17 is a cross-sectional view of the recess and the seal member in another combination according to the present embodiment.
Figure 18:
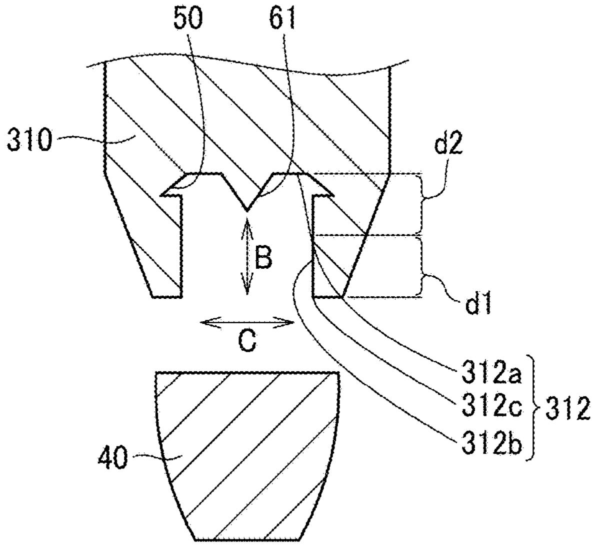
FIG. 18 is a cross-sectional view of the recess and the seal member in still another combination according to the present embodiment.

In the examples illustrated in FIGS. 13 and 14, the width of the recess 312 gradually increase toward the opening rim 312*c*, but the width of the recess 312 may increase stepwise as in the example illustrated in FIG. 16. The width of the seal member 40 may be constant when the width of the recess 312 gradually increase toward the opening rim 312*c* as in the example illustrated in FIG. 17. On the other hand, when the width of the seal member 40 decreases toward the leading end (toward the nozzle 14), the width of the recess 312 in the region d1 of the half of the recess 312 may be constant as in the example illustrated in FIG. 18. That is, at least one of the width of the recess 312 or the width of the seal member 40 changes (increases or decreases, respectively) to form the clearance between the seal member 40 and the side face 312*b* of the recess 312 in the region d1 of the half of the recess 312 including at least opening rim 312*c*.

Figure 19:
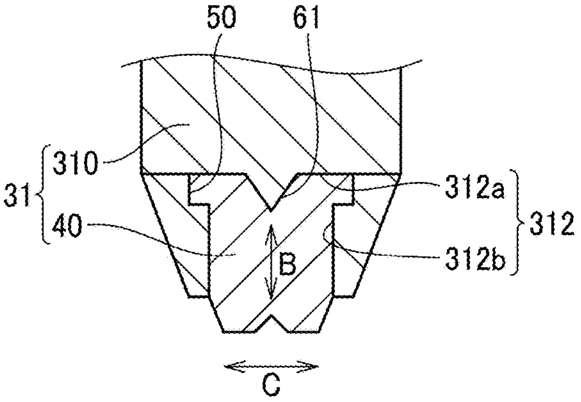
FIG. 19 is a cross-sectional view of the core divided into two parts.

The core 310 may be divided into two parts along the bottom face 312*a* of the recess 312 as in the example illustrated in FIG. 19. This configuration allows the retaining portion 50 to be processed from the bottom face 312*a* side of the recess 312, thereby facilitating forming the retaining portion 50.

Figure 20:
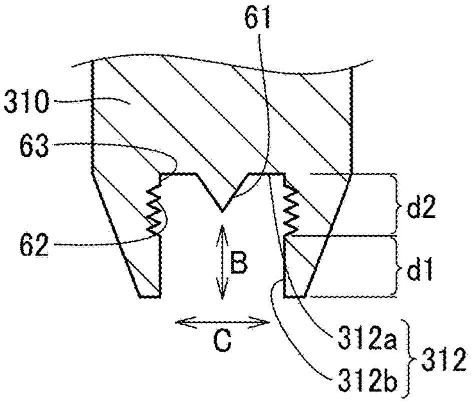
FIG. 20 is a cross-sectional view of the recess according to yet another modification of the present embodiment.
Figure 21:
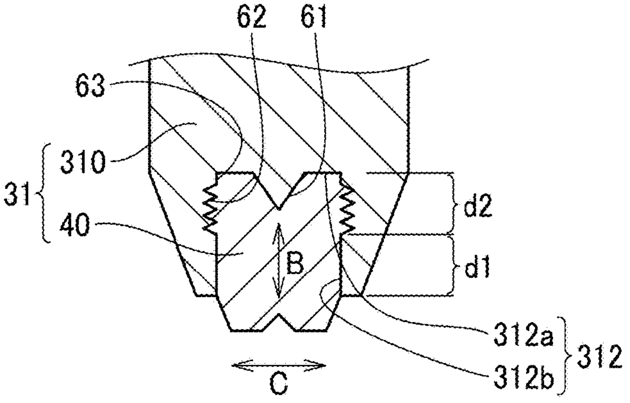
FIG. 21 is a cross-sectional view of the recess illustrated in FIG. 20 into which the seal member is inserted.

The retaining portion 50 may be a plurality of grooves 62 formed continuously in the depth direction B of the recess 312 as in the example illustrated in FIG. 20. In this case, when the seal member 40 is inserted into the recess 312, a portion of the seal member 40 is filled in the groove 62 to join the seal member 40 to the recess 312 as illustrated in FIG. 21, thereby preventing the seal member 40 from falling off the recess 312. The grooves 62 serving as the retaining portion 50 is disposed in the region d2 of the half of the recess 312 on the bottom face 312*a* side in the depth direction B, allowing the seal member 40 on the leading end side to exhibit the good elastic behavior similarly to the above-described embodiment. Accordingly, also in this example, the seal member 40 can be joined to the core 310 of the valve 31 while maintaining the elastic behavior of the seal member 40. The grooves 62 may be multiple annular grooves formed independently of each other, or may be a single spiral groove formed continuously. The groove 62 may have a rectangular cross section or a semicircular cross section besides a triangular cross section as illustrated in FIG. 20.

In the example illustrated in FIG. 20, a straight portion 63 in which the groove 62 is not formed is disposed between the groove 62 and the bottom face 312*a*. The straight portion 63 is a cylindrical face extending in the direction (depth direction B) orthogonal to the bottom face 312*a*. Accordingly, in the straight portion 63, the width of the recess 312 does not change and is constant in the depth direction B. As described above, since the straight portion 63 is disposed between the groove 62 and the bottom face 312*a*, the grooves 62 can be easily formed without cutting the inner surface of the recess 312 up to the bottom face 312*a*.

Figure 22A:
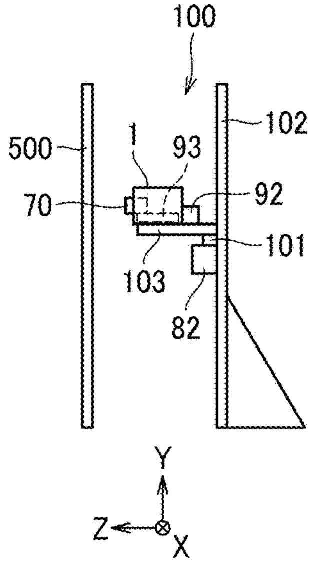
FIGS. 22A and 22B are overall schematic views of a liquid discharge apparatus according to the present embodiment.
Figure 22B:
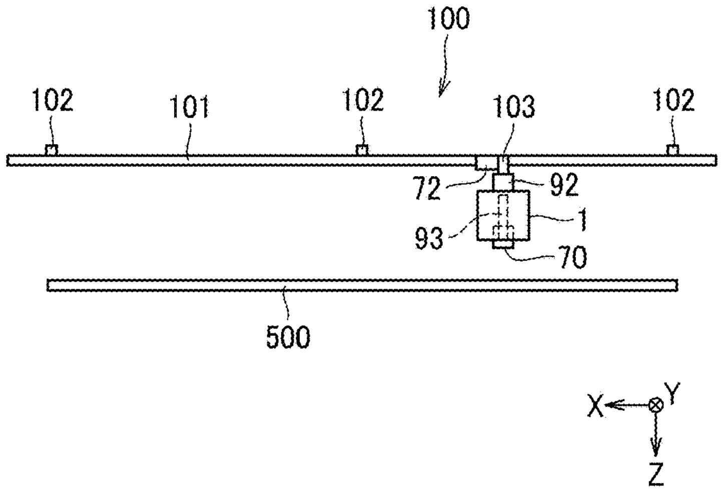

A description is given below of a liquid discharge apparatus 100 including the liquid discharge head 10 described above. FIGS. 22A and 22B are overall schematic views of the liquid discharge apparatus 100. FIG. 22A is a side view, and FIG. 22B is a plan view of the liquid discharge apparatus 100. The liquid discharge apparatus 100 is installed so as to face an object 500 onto which ink (liquid) is applied. The liquid discharge apparatus 100 includes an X-axis rail 101, a Y-axis rail 102 intersecting the X-axis rail 101, and a Z-axis rail 103 intersecting the X-axis rail 101 and the Y-axis rail 102. In particular, in the present embodiment, the X-axis, Y-axis, and Z-axis rails 101, 102, and 103 extend in directions orthogonal to each other.

The Y-axis rail 102 movably holds the X-axis rail 101 along the Y-axis. The X-axis rail 101 movably holds the Z-axis rail 103 along the X-axis. The Z-axis rail 103 movably holds a carriage 1 along the Z-axis.

Further, the liquid discharge apparatus 100 includes a first Z-direction driver 92 and an X-direction driver 72. The first Z-direction driver 92 moves the carriage 1 in the Z direction along the Z-axis rail 103. The X-direction driver 72 moves the Z-axis rail 103 in the X direction along the X-axis rail 101. The liquid discharge apparatus 100 further includes a Y-direction driver 82 that moves the X-axis rail 101 in the Y direction along the Y-axis rail 102. Further, the liquid discharge apparatus 100 includes a second Z-direction driver 93 that moves a head holder 70 relative to the carriage 1 in the Z direction.

The liquid discharge head 10 described above is attached to the head holder 70 mounted on the carriage 1 so that the nozzle 14 (see FIG. 2) of the liquid discharge head 10 faces the object 500. The liquid discharge apparatus 100 described above discharges ink, as an example of a liquid, from the liquid discharge head 10 attached to the head holder 70 toward the object 500 while moving the carriage 1 along the X-axis, the Y-axis, and the-Z axis to move the liquid discharge head 10, thereby drawing images on the object 500.

Figure 23:
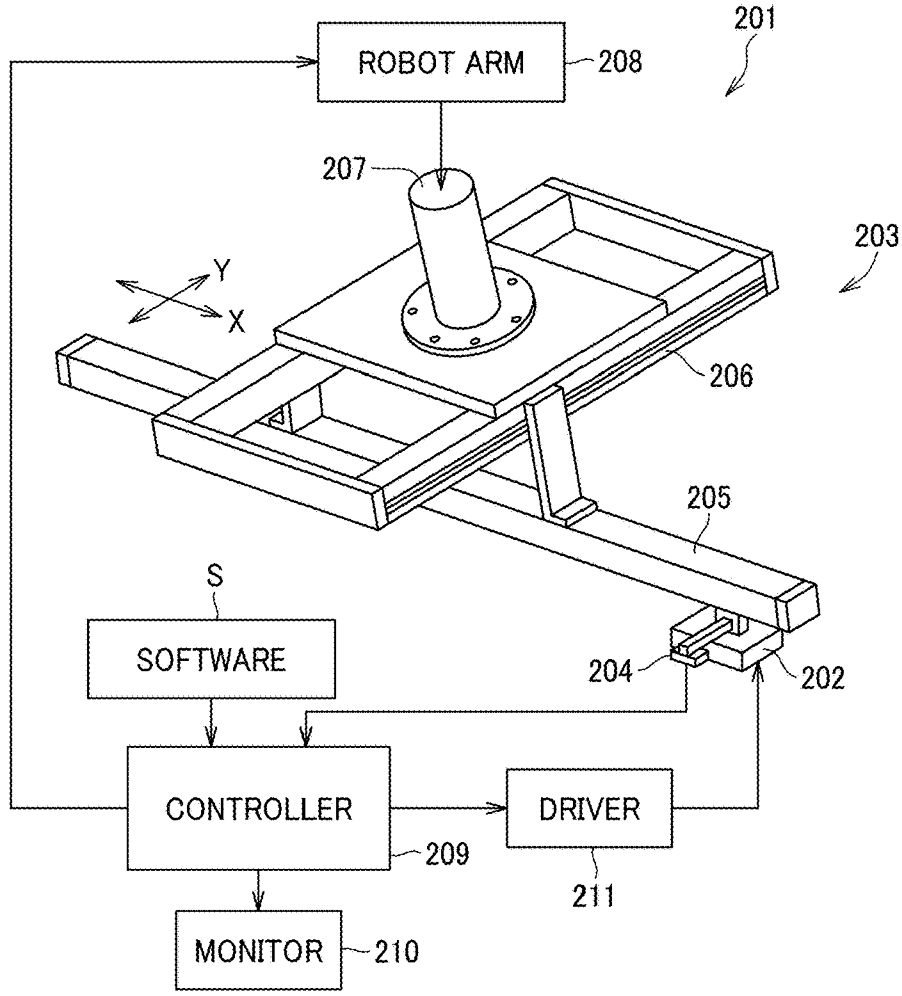
FIG. 23 is a diagram illustrating a configuration of the liquid discharge apparatus according to another embodiment of the present disclosure.
Figure 24:
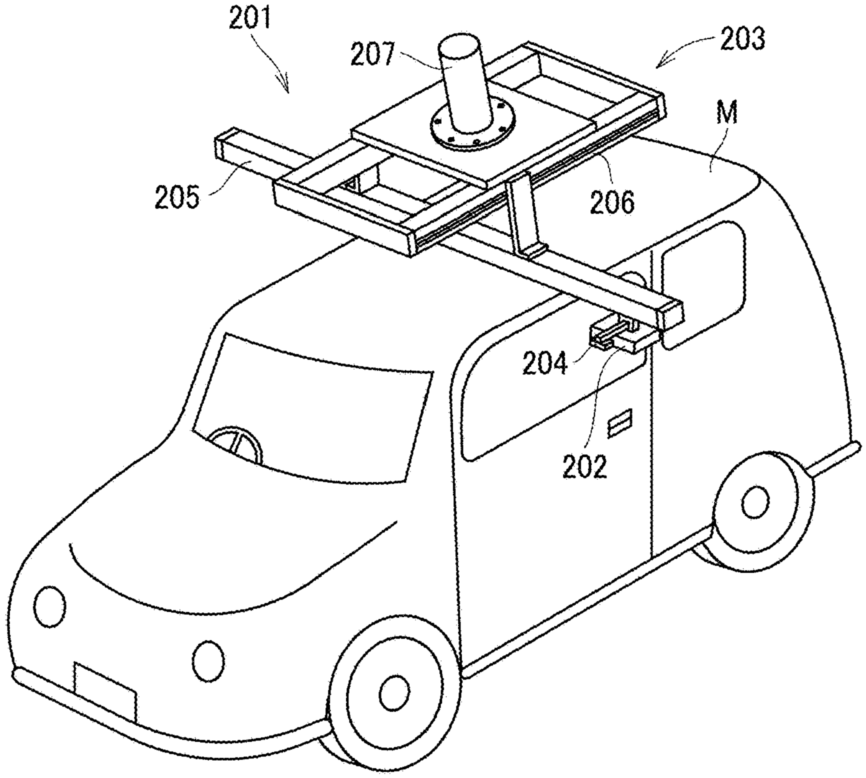
FIG. 24 is a perspective view of the liquid discharge apparatus in FIG. 23 installed in an arrangement so as to face an automobile.
Figure 25:
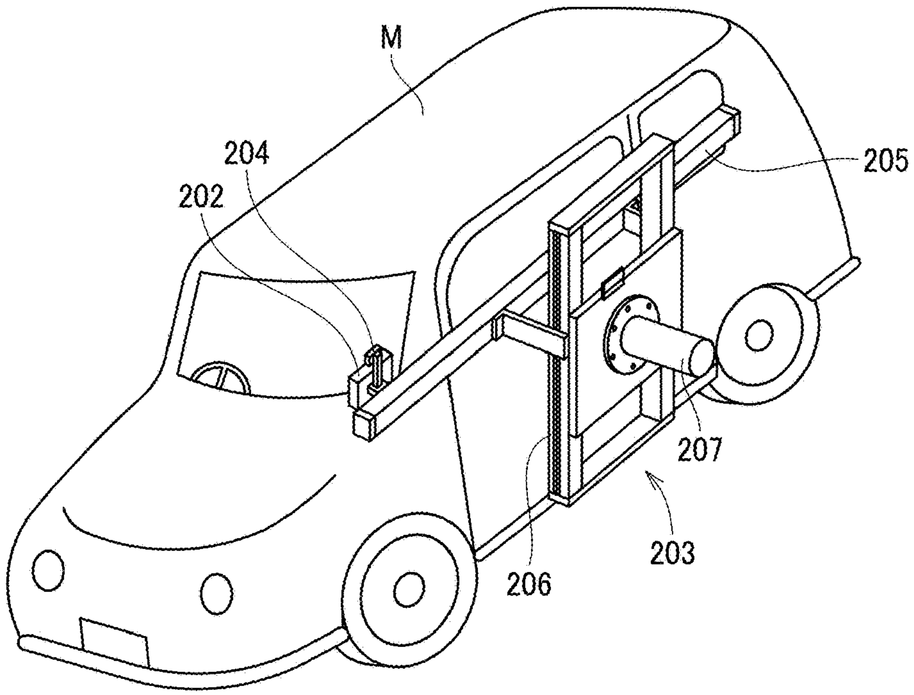
FIG. 25 is a perspective view of the liquid discharge apparatus in FIG. 23 installed in another arrangement so as to face the automobile.
Figure 26A:
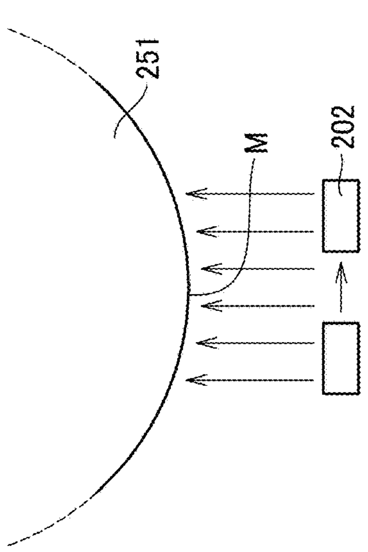
FIGS. 26A to 26C are diagrams illustrating an image printed on a spherical surface by the liquid discharge apparatus.
Figure 26B:
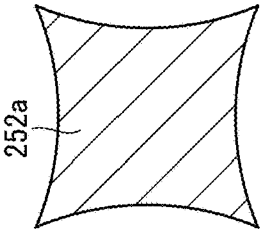
Figure 26C:
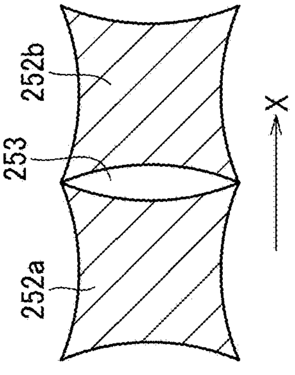

A description is given below of a configuration of an inkjet printer 201 as another example of the liquid discharge apparatus according to the present embodiment with reference to FIGS. 23 to 26. FIG. 23 is a diagram illustrating a configuration of the inkjet printer 201 as the example of the liquid discharge apparatus according to the present embodiment. FIG. 24 is a schematic perspective view of the inkjet printer 201 illustrated in FIG. 23 installed so as to face an object M onto which ink (liquid) is applied, such as an automobile. FIG. 25 is a schematic perspective view of the inkjet printer 201 illustrated in FIG. 23 installed in another arrangement so as to face the object M onto which ink (liquid) is applied, such as the automobile. FIGS. 26A to 26C are diagrams illustrating images printed on a spherical surface of the object M by the inkjet printer 201. FIG. 26A is a diagram illustrating the object M having the spherical surface onto which ink is discharged from a print head 202 by the inkjet printer 201. FIG. 26B is a diagram illustrating a quadrangle image printed on the spherical surface by the inkjet printer 201. FIG. 26B is a diagram illustrating two quadrangle images successively printed on the spherical surface by the inkjet printer 201.

As illustrated in FIG. 23, the inkjet printer 201 according to the present embodiment includes the print head 202, an X-Y table 203, a camera 204, a controller 209, a driver 211, and the like.

The print head 202 is an inkjet liquid discharge head, such as the liquid discharge head 10 described above, that discharges ink (liquid) toward the surface the object M to be coated. The term "ink" in the present disclosure includes "paint." The print head 202 includes a plurality of valve-type nozzles and discharges ink from each valve-type nozzle in a direction perpendicular to a discharge surface of the print head 202. The discharge surface of the print head 202 from which ink is discharged is parallel to the X-Y plane formed by the movement of the X-Y table 203, and the ink is discharged from each valve-type nozzle in the direction perpendicular to the X-Y plane. The ink is discharged from the respective valve-type nozzles in parallel to each other. Each valve-type nozzle communicates with an ink tank of a predetermined color. The ink tank is pressurized by a pressurizing device. A distance between each valve-type nozzle and the surface of the object M to be coated is preferably about 20 cm to discharge ink from each valve-type nozzle onto the surface of the object M as desired.

The X-Y table 203 includes a mechanism that moves the print head 202 and the camera 204 in the X and Y directions orthogonal to each other. Specifically, the X-Y table 203 includes an X-axis moving mechanism 205 that moves a slider holding the print head 202 and a camera 204, which is described later, in the X direction, and a Y-axis moving mechanism 206 that moves the X-axis moving mechanism 205 in the Y direction while holding the X-axis moving mechanism 205 with two arms. The Y-axis moving mechanism 206 includes a shaft 207, and a robot arm 208 holds and drives the shaft 207 to freely move the print head 202 to a predetermined position at which the print head 202 coats the object M with ink. For example, when the object M is the automobile, the robot arm 208 can position the print head 202 at the top of the automobile as illustrated in FIG. 24 or at the side of the automobile as illustrated in FIG. 25. An operation of the robot arm 208 is controlled based on a program stored in advance in the controller 209.

The camera 204 is an imaging device such as a digital camera that captures an image of the surface of the object M to be coated. The camera 204 is moved in the X direction and the Y direction by the X-axis moving mechanism 205 and the Y-axis moving mechanism 206, and captures an image of the surface of the object M in a predetermined area at small constant intervals. Specifications such as characteristics of a lens and a resolution of the camera 204 are appropriately determined to enable the camera 204 to capture a plurality of subdivided images of a predetermined area of the surface of the object M. The controller 209 described below causes the camera 204 to capture the plurality of subdivided images of the surface of the object M continuously and automatically.

The controller 209 operates the X-Y table 203 based on image editing software S for editing an image captured by the camera 204 and a preset control program to control a printing operation (ink discharge operation) of the print head 202. Examples of the controller 209 includes a so-called microcomputer, and the controller 209 includes a storage device that records and stores various programs, data of captured images, and data of images to be printed, a central processing unit that executes various processing according to the programs, an input device such as a keyboard and a mouse, and a digital versatile disk (DVD) player if desired. The controller 209 further includes a monitor 210. The monitor 210 displays input information to the controller 209, a processing result by the controller 209, and the like.

For example, the print head 202 discharges ink from each nozzle 14 to form a two-dimensional quadrangular image on the spherical surface of the object M by inkjet method in the direction illustrated in FIG. 26A. Since the print head 202 discharges the ink from each nozzle 14 in a direction perpendicular to the print head 202, a printed image 252*a* printed on the surface of the object M has a quadrangular shape with a deformed (bent) periphery as illustrated in FIG. 26B without image processing. When an image 252*b* is printed adjacent to the printed image 252*a* on the surface of the object M that is not flat, a non-printed area 253 may be formed between the image 252*b* and the printed image 252*a* on the object M as illustrated in FIG. 26C.

In the present embodiment, when an image is printed on the surface of the object M that is not flat, the controller 209 performs image processing on data of the plurality of subdivided images captured by the camera 204 using image processing software, and generates a composite print surface onto which the surface of the object M is projected. The controller 209 edits an image to be printed on the surface of the objects so that the image to be printed is continuously connected to a printed image that has already been printed on the surface of the object M at the edges of the image to be printed and the printed image on the composite print surface to create an edited image to be printed.

The controller 209 edits the image 252*b* so as to match the image 252*b* with the composite print surface not to form the non-printed area 253, and creates the edited image to be printed. The print head 202 discharges ink onto the surface of the object M based on the created edited image to be printed, thereby printing the image 252*b* adjacent to the printed image 252*a* without a gap (i.e., the non-printed area 253) between the image 252*b* and the printed image 252*a*. The controller 209 controls the driver 211 to cause the camera 204 to capture the plurality of subdivided images and to cause the print head 202 to discharge ink from each nozzle to print an image on the object M.

In the present disclosure, the term "liquid discharge apparatus" includes a liquid discharge head and drives the liquid discharge head to discharge liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" serves as the object onto which liquid is applied as described above and represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The above-described embodiments of the present disclosure includes a liquid discharge head and a liquid discharge apparatus having at least one of configurations described in the following aspects.

Aspect 1

According to Aspect 1, a liquid discharge head include a nozzle plate and a valve. The nozzle plate has a discharge port from which a liquid is discharged. The valve faces the nozzle plate to open and close the discharge port. The valve includes a core having a recess, and an elastic member attached to the core. The recess has: an opening rim on a leading end of the core, the opening rim defining an opening of the recess opening toward the discharge port in a depth direction of the recess; a bottom face opposite to the opening rim in the depth direction: and a retaining portion having a width wider than a width of a portion other than the retaining portion of the recess in a width direction orthogonal to the depth direction, the retaining portion disposed in a rear region between the bottom face and a center of the recess in the depth direction. The elastic member includes a first portion fitted into the recess and a second portion projecting from the recess toward the discharge port.

Aspect 2

According to Aspect 2, in Aspect 1, the first portion of the elastic member is filled in the retaining portion.

Aspect 3

According to Aspect 3, in Aspect 1 or 2, the retaining portion is adjacent to the bottom face.

Aspect 4

According to Aspect 4, in any one of Aspects 1 or 3, the recess further has a projection on the bottom face.

Aspect 5

According to Aspect 5, in any one of Aspects 1 or 4, a side face of the recess and the elastic member are separated by a clearance in the width direction.

Aspect 6

According to Aspect 6, in Aspect 5, a width of the recess in the width direction increases toward the opening rim in the depth direction.

Aspect 7

According to Aspect 7, in Aspect 5 or 6, a width of the elastic member in the width direction decreases toward the discharge port in the depth direction.

Aspect 8

According to Aspect 8, in Aspect 1 or 2, the retaining portion has a plurality of grooves in the rear region. The plurality of grooves extends in the depth direction. The recess further has a straight portion between the plurality of grooves and the bottom face. The straight portion has a width constant in the depth direction.

Aspect 9

According to Aspect 9, in any one of Aspects 1 or 8, the valve moves to a contact position at which the valve presses the elastic member against the nozzle plate to close the discharge port and moves to a separated position at which the valve separates the elastic member from the nozzle plate to open the discharge port.

Aspect 10

According to Aspect 10, a liquid discharge apparatus includes the liquid discharge head according to any one of Aspects 1 to 9, and a carriage mounting the liquid discharge head and configured to move the liquid discharge head.

As described above, according to the present disclosure, the elastic member can be joined to the core of the valve while maintaining the good elastic behavior.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
a nozzle plate having a discharge port from which a liquid is discharged; and
a valve facing the nozzle plate, the valve being configured to open and close the discharge port, the valve including:
a core; and
an elastic member attached to the core,
wherein the core has a recess,
wherein the recess has:
an opening rim on a leading end of the core, the opening rim defining an opening of the recess, and the opening of the recess opening toward the discharge port in a depth direction of the recess;
a bottom face opposite to the opening rim in the depth direction; and
a retaining portion having a width wider than a width of a portion other than the retaining portion of the recess in a width direction orthogonal to the depth direction, the retaining portion being disposed in a rear region between the bottom face and a center of the recess in the depth direction, wherein the retaining portion includes at least one groove having a triangular cross-section, and wherein the elastic member includes:
a first portion fitted into the recess; and
a second portion projecting from the opening of the recess toward the discharge port in the depth direction.

2. The liquid discharge head according to claim 1, wherein the first portion of the elastic member is filled in the retaining portion.

3. The liquid discharge head according to claim 1, wherein the retaining portion is adjacent to the bottom face.

4. The liquid discharge head according to claim 1, wherein the recess further has a projection on the bottom face.

5. The liquid discharge head according to claim 1, wherein a side face of the recess and the elastic member are separated by a clearance in the width direction.

6. The liquid discharge head according to claim 5, wherein a width of the recess in the width direction increases toward the opening rim in the depth direction.

7. The liquid discharge head according to claim 5, wherein a width of the elastic member in the width direction decreases toward the discharge port in the depth direction.

8. The liquid discharge head according to claim 1, wherein the at least one groove includes a plurality of grooves in the rear region, the plurality of grooves extending in the depth direction, and
wherein the recess further has a straight portion between the plurality of grooves and the bottom face, the straight portion having a width that is constant in the depth direction.

9. The liquid discharge head according to claim 1, wherein the valve is configured to:
move to a contact position at which the valve presses the elastic member against the nozzle plate to close the discharge port; and
move to a separated position at which the valve separates the elastic member from the nozzle plate to open the discharge port.

10. A liquid discharge apparatus comprising:
the liquid discharge head according to claim 1; and
a carriage mounting the liquid discharge head and configured to move the liquid discharge head.

11. A liquid discharge head comprising:
a nozzle plate having a discharge port from which a liquid is discharged; and
a valve facing the nozzle plate, the valve being configured to open and close the discharge port, the valve including:
a core; and
an elastic member attached to the core,
wherein the core has a recess,
wherein the recess has:
an opening rim on a leading end of the core, the opening rim defining an opening of the recess, and the opening of the recess opening toward the discharge port in a depth direction of the recess;
a bottom face opposite to the opening rim in the depth direction; and
a retaining portion having a width wider than a width of a portion other than the retaining portion of the recess in a width direction orthogonal to the depth direction, the retaining portion being disposed in a rear region between the bottom face and a center of the recess in the depth direction, wherein the retaining portion includes a plurality of grooves having triangular cross-sections, and
wherein the elastic member includes:
a first portion fitted into the recess; and
a second portion projecting from the opening of the recess toward the discharge port in the depth direction.

12. The liquid discharge head according to claim 11, wherein:
the recess further has a straight portion between the plurality of grooves and the bottom face, and
the straight portion has a width that is constant in the depth direction.

13. A liquid discharge head comprising:
a nozzle plate having a discharge port from which a liquid is discharged; and
a valve facing the nozzle plate, the valve being configured to open and close the discharge port, the valve including:
a core; and
an elastic member attached to the core,
wherein the core has a recess,
wherein the recess has:
an opening rim on a leading end of the core, the opening rim defining an opening of the recess, and the opening of the recess opening toward the discharge port in a depth direction of the recess;
a bottom face opposite to the opening rim in the depth direction;
a retaining portion having a width wider than a width of a portion other than the retaining portion of the recess in a width direction orthogonal to the depth direction, the retaining portion being disposed in a rear region between the bottom face and a center of the recess in the depth direction; and a projection on the bottom face, the projection having a conical shape or a pyramid shape having a triangular cross section, and wherein the elastic member includes:

a first portion fitted into the recess; and a second portion projecting from the opening of the recess toward the discharge port in the depth direction.

14. The liquid discharge head according to claim 13, wherein the first portion of the elastic member is filled in the retaining portion.

15. The liquid discharge head according to claim 13, wherein the retaining portion is adjacent to the bottom face.

16. The liquid discharge head according to claim 13, wherein a side face of the recess and the elastic member are separated by a clearance in the width direction.

17. The liquid discharge head according to claim 16, wherein a width of the recess in the width direction increases toward the opening rim in the depth direction.

18. The liquid discharge head according to claim 16, wherein a width of the elastic member in the width direction decreases toward the discharge port in the depth direction.

19. The liquid discharge head according to claim 13, wherein the retaining portion includes at least one groove having a triangular cross-section.

20. The liquid discharge head according to claim 13, wherein the retaining portion has a plurality of grooves in the rear region, the plurality of grooves extending in the depth direction, and wherein the recess further has a straight portion between the plurality of grooves and the bottom face, the straight portion having a width constant in the depth direction.

* * * * *